(12) United States Patent
Dunn et al.

(10) Patent No.: US 8,320,083 B1
(45) Date of Patent: Nov. 27, 2012

(54) ELECTRICAL INTERCONNECT WITH IMPROVED CORROSION RESISTANCE FOR A DISK DRIVE HEAD SUSPENSION

(75) Inventors: Christopher Dunn, Austin, TX (US); Keith A. Vanderlee, Austin, TX (US)

(73) Assignee: Magnecomp Corporation, Murrieta, CA (US)

( * ) Notice: Subject to any disclaimer, the term of this patent is extended or adjusted under 35 U.S.C. 154(b) by 1262 days.

(21) Appl. No.: 11/951,619

(22) Filed: Dec. 6, 2007

(51) Int. Cl.
G11B 21/16 (2006.01)
G11B 5/48 (2006.01)

(52) U.S. Cl. ............... 360/245.9; 360/234.5; 360/245.8; 360/264.2

(58) Field of Classification Search ............... 360/245.8, 360/245.9, 246, 234.5, 264.2
See application file for complete search history.

(56) References Cited

U.S. PATENT DOCUMENTS

| | | | |
|---|---|---|---|
| 5,666,717 A | 9/1997 | Matsumoto et al. | |
| 6,075,676 A * | 6/2000 | Hiraoka et al. | 360/264.2 |
| 6,106,688 A | 8/2000 | Miyazaki et al. | |
| 6,360,427 B1 * | 3/2002 | Takasugi | 29/603.06 |
| 6,399,899 B1 | 6/2002 | Ohkawa et al. | |
| 6,515,832 B1 * | 2/2003 | Girard | 360/245.3 |
| 6,996,901 B2 | 2/2006 | Honjo et al. | |
| 7,067,912 B2 | 6/2006 | Takeuchi et al. | |
| 7,129,418 B2 | 10/2006 | Aonuma et al. | |
| 7,142,395 B2 | 11/2006 | Swanson et al. | |
| 7,372,669 B2 * | 5/2008 | Deguchi et al. | 360/245.9 |
| 2005/0023703 A1 * | 2/2005 | Sebesta et al. | 257/780 |
| 2005/0186332 A1 | 8/2005 | Funada et al. | |
| 2007/0051534 A1 | 3/2007 | Ishii et al. | |
| 2008/0192384 A1 * | 8/2008 | Danielson et al. | 360/245.9 |
| 2008/0247074 A1 * | 10/2008 | Nave et al. | 360/69 |

FOREIGN PATENT DOCUMENTS

JP 60-119765 A * 6/1985
JP 2008-60133 A * 3/2008

* cited by examiner

*Primary Examiner* — Jefferson Evans
(74) *Attorney, Agent, or Firm* — Intellectual Property Law Offices of Joel Voelzke, APC

(57) ABSTRACT

An electrical interconnect and a method of making an electrical interconnect in which a conductor has been substantially plated with a first protective metal shell, such as nickel, and a second outer metal shell, such as gold, before a covercoat has been applied. Such an electrical interconnect can be characterized as having an even-thickness outer shell on both its terminal pads and underneath the covercoat adjacent to the terminal pads, without overhangs or gaps near the bottom of the covercoat caused by surface etching during production.

20 Claims, 14 Drawing Sheets

ELECTRICAL INTERCONNECT WITH IMPROVED CORROSION RESISTANCE FOR A DISK DRIVE HEAD SUSPENSION

CROSS-REFERENCE TO RELATED APPLICATIONS

Not Applicable

BACKGROUND OF THE INVENTION

1. Field of the Invention

This invention relates to the field of disk drive storage devices. More particularly, this invention relates to a corrosion resistant electrical interconnect for a disk drive suspension and a method of producing such an electrical interconnect.

2. Description of Related Art

A disk drive generally uses several spinning storage medium (e.g. disks) to store data. Several read/write heads are positioned in close proximity to the disks by suspension assemblies. In a hard disk drive, a suspension assembly commonly refers to the combination of a slider/head, containing the read-write circuitry affixed to the distal end of the suspension. The suspension supports the slider as well as an electrical interconnect. The electrical interconnect connects the read/write head, located on the slider at the end of the head suspension over a disk, to disk drive circuits at the proximal end of the head suspension. The electrical interconnect carries electrical signals from the read/write head that are read from the disk across the head suspension to disk drive circuitry. It also carries electrical signals to be written to the disk from the disk drive circuitry across the head suspension to the read/write head.

An electrical interconnect can be created by an additive circuit laying process where layers are essentially added to an insulating base.

An insulating base is sometimes called an insulating or insulative substrate, film, or base layer. The purpose of the insulating base is typically to provide a supporting surface, with low electrical conductivity, upon which circuitry can be added. It is common to call the side of the insulating base upon which circuitry can be added the "top" of the insulating base, and the opposing side the "bottom."

An insulating base can be a single insulating layer or multiple layers. An insulating base can have multiple layers of insulating and non-insulating layers as long as an insulating layer is on the top. A non-insulating layer is typically conductive. A conductive layer is sometimes called a conductor layer, conductive substrate, or metal substrate, and can include a thin metal foil or a supporting metal plate. Non-insulating layers within an insulating base may include a layer or multiple layers which support the top insulating layer. If a layer supports the top insulating layer, then the supporting layer is sometimes called a supporting substrate. For example, a supporting substrate can be part of a stainless steel load beam.

In an additive process, a relatively thin seed layer is typically added to the top of an insulating base. A seed layer is sometimes called a thin metal film. A seed layer is added to the insulating base by vacuum deposition, such as sputtering. Typically, the seed layer is deposited over the entire top side of the insulating base so as to form a continuous sheet. The seed layer can be a single stratum of material, or it can be multiple stratums of material formed sequentially. The top stratum of a seed layer is typically the same material as will be used for the conductor, discussed below.

On top of the seed layer is typically added a plating resist pattern. Plating resist material, which makes up the plating resist pattern, prevents metal from plating on portions of the seed layer which it covers and provides a vertical profile to which the metal will conform. The plating resist pattern can be applied in a reverse pattern with respect to the final wired circuit pattern. The thickness of the plating resist is chosen as at least the thickness of the metal to be plated.

"Applying" a layer can include any method which forms a patterned layer on a surface. Applying can include the multiple steps of spreading a photosensitive resin on a surface, exposing the resin to a pattern of light or other electromagnetic radiation, developing the pattern (or reverse pattern), washing away the undeveloped resin, and baking the resin. Applying can also include the use of a dry film resist.

The insulating base, seed layer, and plating resist pattern are then subjected to a plating process in which a conductor is plated. Such plating is sometimes called "conductor-plating." A conductor is any material, such as copper metal, which is suitable for carrying a majority of current in an electrical interconnect. The plated conductor is formed on the exposed seed layer, in a reversal pattern with respect to the plating resist pattern on the seed layer. The pattern that the conductor conforms to is sometimes called a wiring pattern or circuit pattern.

The term, "plating," is a general surface-covering technique in which a metal is deposited onto a conductive surface. The term most often refers to electroplating or electroless plating, both typically performed in a liquid bath.

The insulating substrate, seed layer, plating resist pattern, and plated conductor arrayed in a wired circuit pattern are sometimes collectively called an inchoate electrical interconnect. The inchoate electrical interconnect is considered a workpiece.

The term, "workpiece," can refer to any starting piece or any product of an intermediate process. A workpiece includes material or parts of a workpiece that will remain in a final product or be removed in later processes. A workpiece can be rigid or non-rigid. A workpiece is usually self-cohesive, but can include evanescent matter that will easily fall off, drip off, evaporate, or sublimate, such as a liquid on a surface that has not yet evaporated.

After conductor-plating, an optional layer of protective metal can be plated over the conductor. This is sometimes called "protective-metal-plating." Protective metal can be any metal suited to protect a conductor underneath, such as nickel or a nickel-phosphorous alloy. Nickel is a suitable substance because nickel exposed to air forms a nickel-oxide layer which can protect an underlying conductor, such as copper, from oxidizing. The plating of nickel in disk drive head suspensions is often in the form of electroless nickel plating. Electroless nickel plating is commonly done at very high temperature.

The plating resist pattern can then be stripped from the workpiece, and portions of the seed layer which had underlain the plating resist pattern can be etched away. The etching of the seed layer, which typically covers the entire top side of the insulating base, can electrically isolate various conductor features, such as different wire traces.

A covercoat is then applied as an insulator to protect the conductor and prevent accidental shorts. A covercoat is sometimes cured (imidized) at elevated temperatures, such as 250° C. or more. The covercoat is rarely applied to terminal pads or other areas which will remain exposed.

Surfaces of the conductor which are still exposed, such as on terminal pads, can be coated with various metals for corrosion resistance, scratch protection, bonding facilitation, and other desirable properties. These metal coatings are often plated in what are sometimes called secondary plating operations.

Before secondary plating operations commence, the exposed surfaces are usually cleaned in a pretreatment process and activated with a weak acid etch. Etching at this stage in a process is sometimes called "surface-etching." If an optional protective metal was plated over the conductor, then it has probably started to oxidize. Nickel-oxide forms more quickly at elevated temperatures. The optional protective metal is peeled away or etched with a strong acid etch from the terminal pads in preparation for subsequent plating.

After pretreatment and surface-etching, the exposed conductor surfaces are plated with a first layer of protective metal. This metal can be the same type used for the optional protective layer. To improve bonding and contact characteristics, terminal pads are sometimes plated with a second layer of contact metal, such as gold. This is sometimes called "contact-metal-plating." Contact metal can be any metal used to improve the connection characteristics of a terminal contact, such as but not limited to gold or silver. Gold is often used as a contact metal because it is corrosion resistant, electrically conductive, ductile, and relatively nontoxic. Nickel is often used as the protective metal between a copper conductor and a gold layer because a nickel layer can reduce the occurrence of copper diffusing into gold and discoloring the gold surface.

Hard drive reliability is a critical part of hard drive qualification, and it is more important to hard drive applications requiring severe environmental conditions and a longer lifetime. One of the key drive reliability tests in some applications is hard disk drive corrosion testing, where components are tested at 85° C. at 85% relative humidity for anywhere from 24 hours up to 504 hours.

Examples of the manufacturing steps outlined above are disclosed in U.S. Pat. No. 6,399,899 issued to Ohkawa et al. in FIGS. 5-8 and U.S. Pat. No. 7,129,418 issued to Aonuma et al. in FIGS. 2-3.

There is a need for an improved electrical interconnect for a disk drive head suspension. Specifically, there is a need for an electrical interconnect which can better resist corrosion, particularly around its terminal pads, and a method for producing such an electrical interconnect.

SUMMARY OF THE INVENTION

The present invention is an electrical interconnect for a disk drive head suspension and a method of producing such an electrical interconnect. The present invention also includes a disk drive head suspension and a hard disk drive incorporating the electrical interconnect.

A problem encountered in the prior art is that surface-etching can remove metal from areas next to those being surface-etched, underneath a coverlayer. This can especially be a problem on the fringes of terminal pads. The fringes of terminal pads are considered the boundary area between the insulating covercoated portion of a terminal pad region and the exposed portion of the terminal pad itself.

The problem is illustrated in FIGS. 7A-7D. FIG. 7A shows a terminal pad 725 of an electrical interconnect with a supporting substrate 741, insulating base 743, seed layer 745, conductor 749, and covercoat 755. Terminal pad 725 has a fringe 726. In FIG. 7B, a surface etch solution partially etches conductor 749 at terminal pad 725 and also partially underneath covercoat 755. A gap 728 results from the surface-etching. Gap 728 is sometimes called an overhang. Gap 728 can trap small dust particles or other debris as illustrated in FIG. 7C. FIG. 7D shows secondary plating operations which can embed the debris.

The problem can be worse if an optional protective metal shell, such as a nickel shell, is plated over a conductor. Referring to FIGS. 8A-8B, the exposed surface of an optional nickel shell 839 of a terminal pad 825 generally must be peeled or etched before subsequent plating operations. If nickel shell 839 is peeled, then fragments can stay behind and contaminate subsequent plating operations. Peeling may also tear away too much material, such as portions underneath covercoat 855, resulting in a gap. If optional nickel shell 839 is etched, then the etching solution will partially dissolve nickel from underneath covercoat 855 at fringe 826, causing a gap 828. If the etching solution penetrates all the way through optional nickel shell 839, then the problem can be exacerbated. An etching solution for nickel is typically stronger than for copper. Thus, once the stronger etching solution penetrates all the way through a nickel protective metal shell, it will attack copper conductor 849 quickly, causing a larger gap.

Surface-etching has been observed to cause gaps as large as 1-1.2 µm deep in a conductor, depending on the aggressiveness of the surface etch solution. Furthermore, because a typical polyimide covercoat is formed with a sloping wall, there is less covercoat at the fringe of a terminal pad to seal the underlying conductor from the environment. Both the trapped contamination and thinned covercoat are potential failure points for corrosion.

In order to eliminate the overhang and solve the resulting contamination problem, according to the invention a protective metal and a contact metal such as gold are plated to the wire trace before a covercoat is applied. This generally eliminates the need to surface-etch the conductor after the covercoat is applied. Because the surface of the conductor and the surface of the protective metal are not etched or peeled after the covercoat is applied, the bottom surface of the covercoat remains flush with the top surface of the contact metal layer, and no gap is created.

In a first aspect, therefore, the invention is an electrical interconnect with a conductor which is substantially coated with nickel and gold shells, including substantially all areas of the conductor underneath the covercoat as well as the terminal pads. The thickness of the gold shell can be generally the same whether the shell is underneath the covercoat or on the terminal pads. Such even-thickness shells can be formed in a single plating bath for each shell.

In a second aspect, the invention is an electrical interconnect with a circuit pattern which is made of a conductor, a protective metal coating, and a contact metal coating, substantially underneath a covercoat, where the contact metal coating extends flush underneath the covercoat. The second aspect can include a disk drive head suspension using the electrical interconnect and a hard disk drive which uses the disk drive head suspension.

In a third aspect, the invention is an electrical interconnect whose wire trace's contact metal shell, which overlays a protective metal shell, extends substantially underneath a covercoat in a terminal pad region. The thickness of the contact metal shell underneath the covercoat can be generally the same as the thickness of the contact metal shell on the terminal pad itself. Such a wire trace's protective metal shell need not be formed by plating, then peeling or etching, then plating; rather, it can be formed in a single plating bath. The third aspect can also include a disk drive head suspension using the electrical interconnect and a hard disk drive which uses the disk drive head suspension.

In a fourth aspect, the invention is a method of producing an electrical interconnect by protective-metal-plating and contact-metal-plating an inchoate electrical interconnect before applying a covercoat. The method can also include fill-plating the conductor on the inchoate electrical interconnect after surface-etching to fill in gaps and overhangs and performing a second secondary plating operation after forming a flying lead.

Exemplary embodiments of the invention will be further described below with reference to the drawings, in which like numbers refer to like parts.

BRIEF DESCRIPTION OF THE DRAWINGS

FIG. 9A shows the providing of an insulating base on top of a supporting substrate;
FIG. 9B shows the forming of a seed layer;
FIG. 9C shows the applying of a plating resist pattern;
FIG. 9D shows the conductor-plating of a conductor;
FIG. 9E shows the stripping of the plating resist pattern;
FIG. 9F shows the etching of the seed layer;
FIG. 9G shows the surface-etching of the conductor;
FIG. 9H shows protective-metal-plating;
FIG. 9I shows contact-metal-plating; and
FIG. 9J shows the applying of a covercoat.

FIG. 10A shows the providing of a supporting substrate;
FIG. 10R shows contact-metal-plating a second time.

DETAILED DESCRIPTION OF THE PREFERRED EMBODIMENTS

Figure 1:
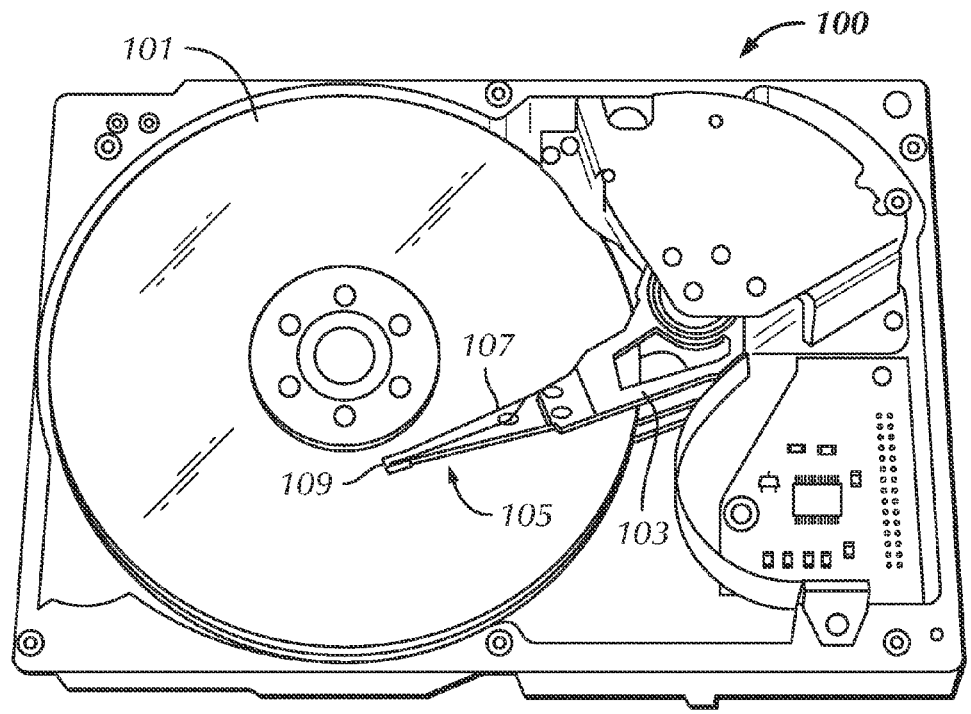
FIG. 1 is a simplified diagram of a hard disk drive according to an embodiment of the present invention.

With reference to FIG. 1, a typical hard disk drive 100 includes at least one data storage disk 101 (e.g., one, two, three, or more disks), at least one actuator arm 103 (e.g., one, two, three, or more actuator arms), and at least one suspension assembly 105 (e.g., one, two, three, or more suspension assemblies). Each suspension assembly is composed of a head suspension 107 and a slider 109. This diagram, as well as other diagrams provided herein, is merely an example, which should not unduly limit the scope of the claims herein. One of ordinary skill in the art would recognize many other variations, modifications, and alternatives.

Disk 101, commonly called a platter, rotates about a fixed axis (or spindle) from about 5,000 rpm up to about 15,000 rpm depending upon the drive. Disk 101 stores information and thus often includes a magnetic medium such as a ferromagnetic material. However, it can also include optical materials, commonly coated on surfaces of the disk, which become active regions for storing digital bit information.

Suspension assembly 105, which overlies (or underlies) a surface of disk 101, operates and controls slider 109 coupled to a read/write head (not shown). Slider 109 is attached to suspension assembly 105 which is in turn is connected to actuator arm 103. Actuator arm 103 is connected to a voice coil motor or VCM, which moves suspension assembly 105 about a pivot point in an annular manner.

Figure 2:
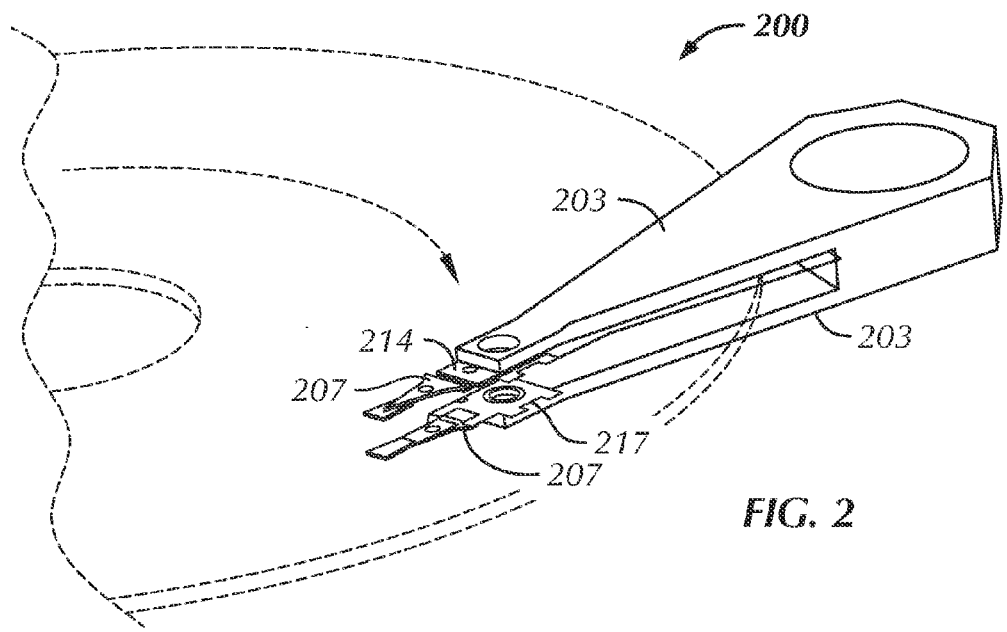
FIG. 2 is a simplified diagram of an actuator arm assembly with a head suspension according to an embodiment of the present invention.

With reference to FIG. 2, actuator arm assembly 200 can include one, two, three, or more actuator arms. In this embodiment, actuator arm assembly 200 includes two actuator arms 203. At a distal portion of each actuator arm 203, a base plate 214 (or mounting plate) connects head suspension 207 to each actuator arm 203 via a hinge member 217, which can be constructed with a proximal portion providing for actuator coupling (via a base plate or, alternatively, directly to an actuator arm). Hinge member 217 provides the needed spring relationship between head suspension 207 and actuator arm 203. Each hinge member 217 can be comprised of a springing metal layer, or any other material providing a suitable spring relationship between head suspension 207 and the actuator arm 203.

Figure 3A:
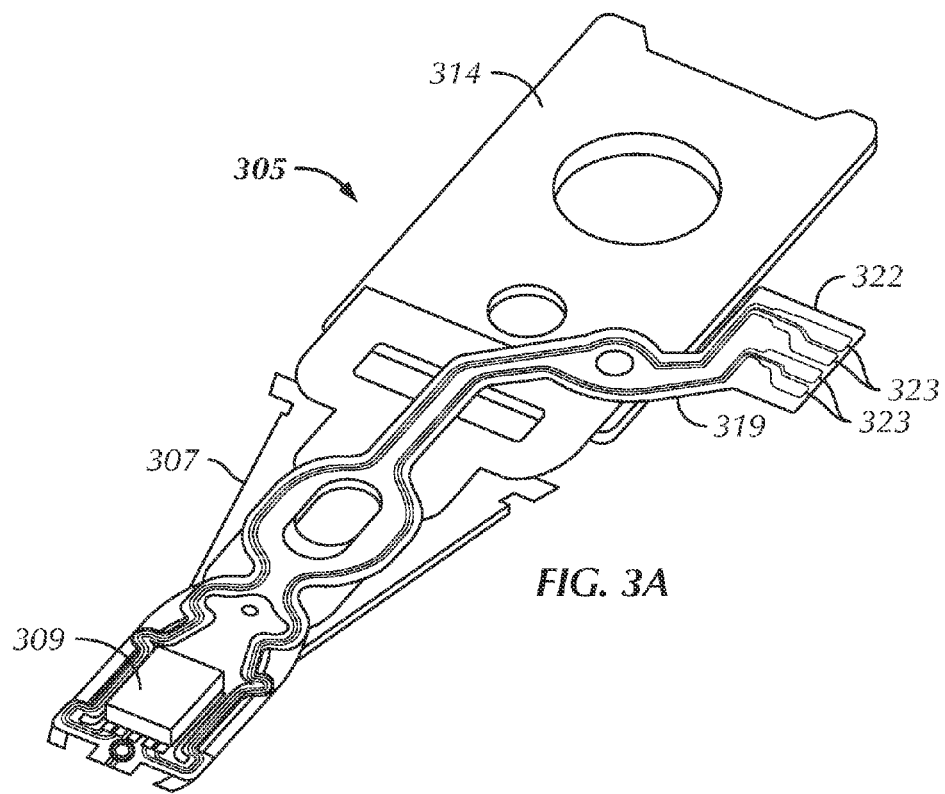
FIG. 3A is a simplified diagram of a suspension assembly with a head suspension according to an embodiment of the present invention.

FIG. 3A is a simplified view of a suspension assembly 305, complete with a base plate 314, head suspension 307, and slider 309. Overlaid on the suspension assembly is an electrical interconnect 319 having a connecting terminal portion 322. Connecting terminal portion 322 includes terminal pad regions 323.

Figure 3B:
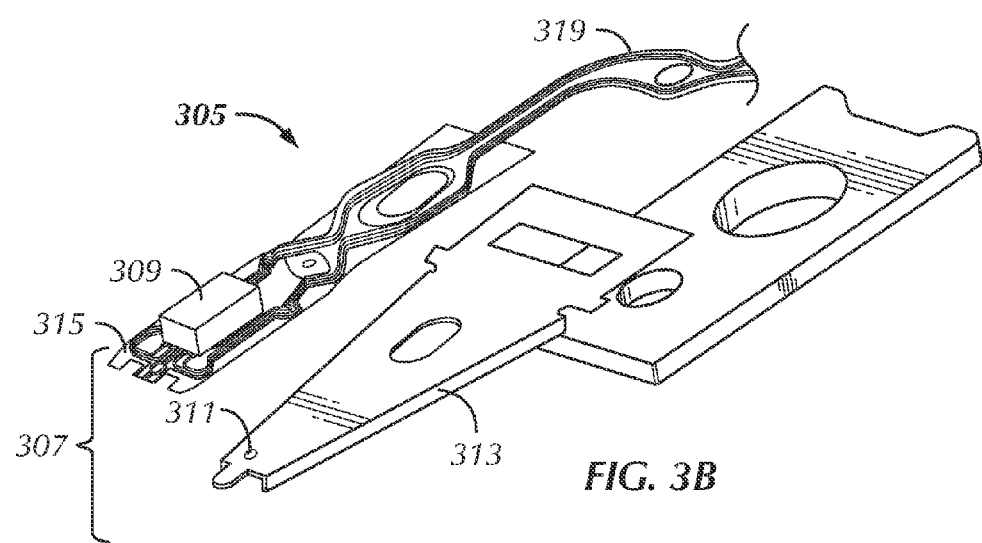
FIG. 3B is an exploded view of the suspension assembly in FIG. 3A.

FIG. 3B is an exploded view of the suspension assembly shown in FIG. 3A. Head suspension 307 is shown split apart, with load beam 313 and flexure 315 separated. In this embodiment, dimple 311 is shown on load beam 313 of the head suspension. A flexure 315 of head suspension 307 holds slider 309. Overlaid on load beam 313 and flexure 315 of head suspension 307 is electrical interconnect 319.

An electrical interconnect is sometimes called a flexible (or flex) circuit, a wired circuit board, or an integrated wire harness. Electrical interconnects on disk drive head suspensions are commonly formed by an additive process in which layers of metal are sputtered, plated, etched, and surface-etched, and insulators are laid down, exposed, developed, and washed away in selective areas to create intricate conductive paths overlaid by an insulator. The metals suitable for electrical signals in an electrical interconnect are commonly called a wire trace. The arrangement of one or more metals in an electrical interconnect is sometimes called a wiring pattern or a circuit pattern.

Figure 4A:
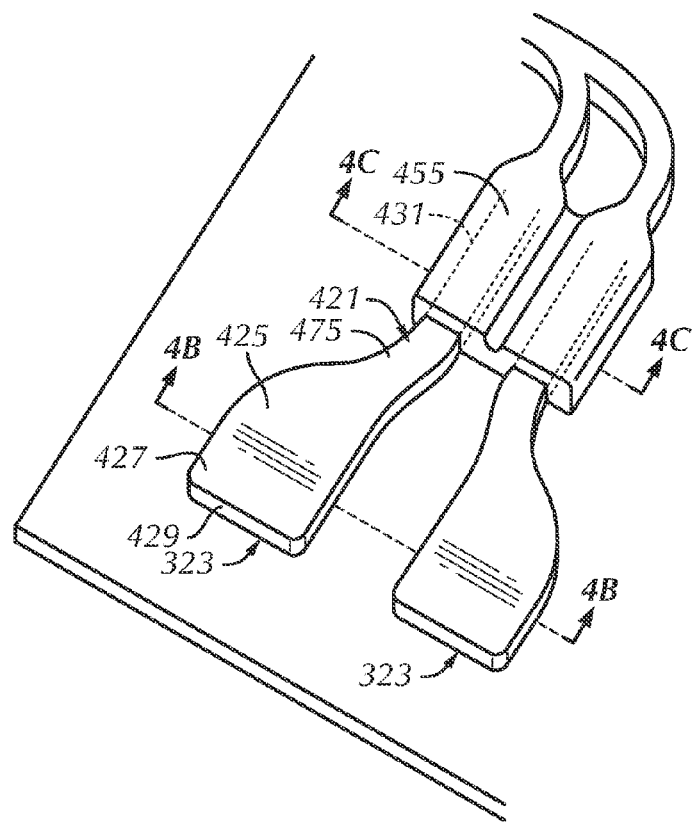
FIG. 4A is a perspective view of a terminal pad region of an electrical interconnect according to an embodiment of the present invention.

FIG. 4A is a perspective view of two terminal pad regions 323. Each terminal pad region 323 includes a portion of wire trace 421 having a terminal pad 425. Terminal pad 425 has a terminal pad top 427 and a terminal pad side 429. Covercoat 455 defines a covercoated area 431 of wire trace 421.

Figure 4B:
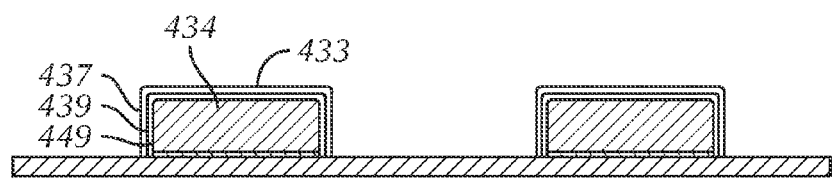
FIG. 4B is a sectional view of the terminal pad region in FIG. 4A taken along section line 4B-4B.
Figure 4C:
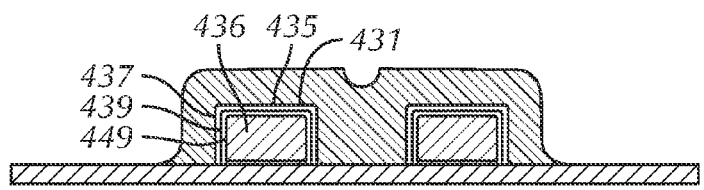
FIG. 4C is a sectional view of the terminal pad region in FIG. 4A taken along section line 4C-4C.

FIG. 4B and FIG. 4C are sectional views of terminal pad region 323 in FIG. 4A taken along section lines 4B-4B and 4C-4C, respectively. Wire trace 421, including covercoated area 431 adjacent to terminal pad 425, has a conductor 449, a protective metal shell 439, and a contact metal shell 437. Exposed surface 433 is on the surface of exposed portion 434 of wire trace 421. If contact metal shell 437 is gold, then terminal pad 425 has an exposed gold top 427 and side 429. Covered surface 435 is on the surface of covered portion 436 of the wiring trace. Contact metal shell 437 has the same general thickness in its exposed portion 434 as in its covered portion 436. A top surface 475 of contact metal shell 437 extends from exposed surface 433 flush underneath covercoat 455 to covered surface 435.

Figure 5:
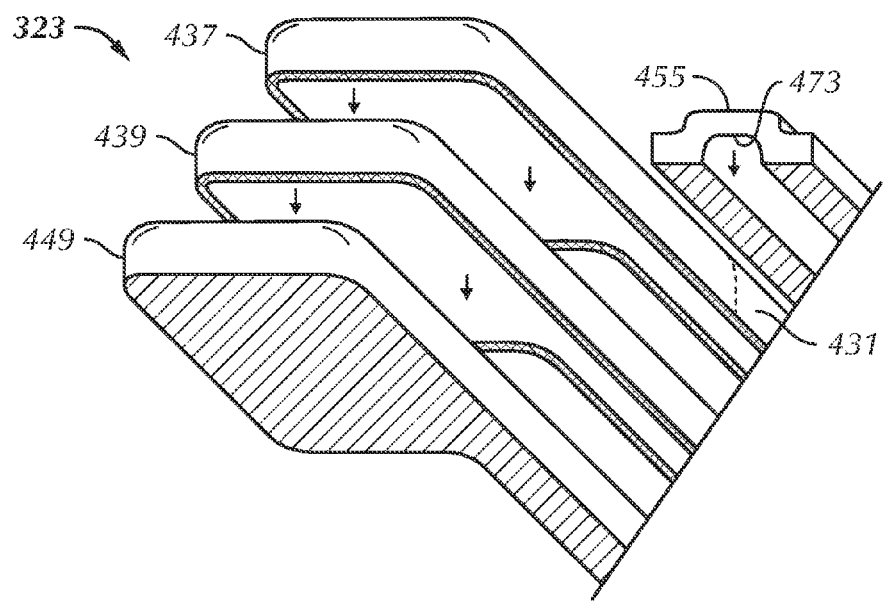
FIG. 5 is an exploded view of a terminal pad.

FIG. 5 is an exploded, perspective view of a portion of one of the terminal pad regions 323 of FIG. 4A. Contact metal shell 437 covers a protective metal shell 439, which in turn covers a conductor 449.

A shell is sometimes called a coating. For example a protective metal shell is the same as a protective metal coating, and a contact metal shell is the same as a contact metal coating. A shell or coating has a top and sides in the same orientation as the top and sides of the insulating base. A shell or coating can but need not coat or cover substantially all of an underlying surface. For example, the upper and side surfaces of conductor 449 can be in intimate contact with protective shell 439. A side need not extend vertically; a side can include a gently rising slope. A top need not extend horizontally; a top can include sloping areas. Substantially all can include 90%, 95%, or more of the underlying surface.

Protective metal shell 439 is preferably an electroless nickel plated shell. Both protective metal shell 439 and contact metal shell 437 may cover only the top and sides of conductor 449, or may also cover underneath conductor 449. Covercoat 455 covers contact metal shell 437 in covercoated area 431. Covercoat 455 has a bottom surface 473. One way to form the metal shells is in successive plating baths.

Figure 6:
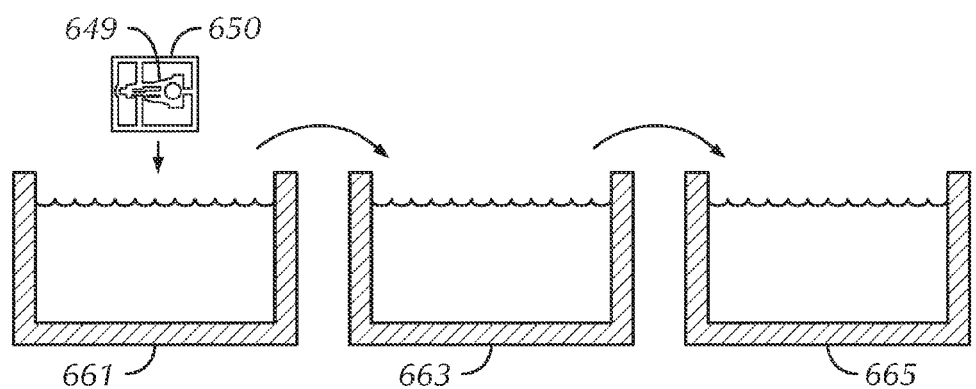
FIG. 6 is a diagram illustrating a set of plating baths which can be used to produce an embodiment of the present invention.
Figure 7A:
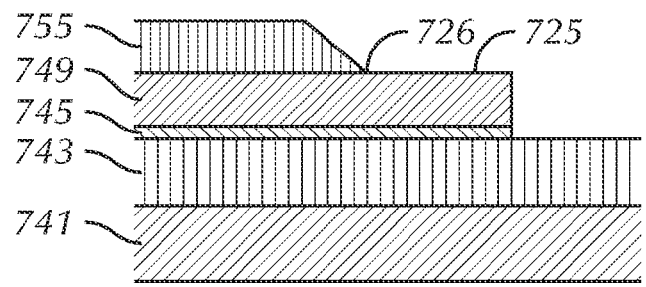
FIGS. 7A-7D are process drawings illustrating conductor etching and plating operations according to the prior art.
Figure 7B:
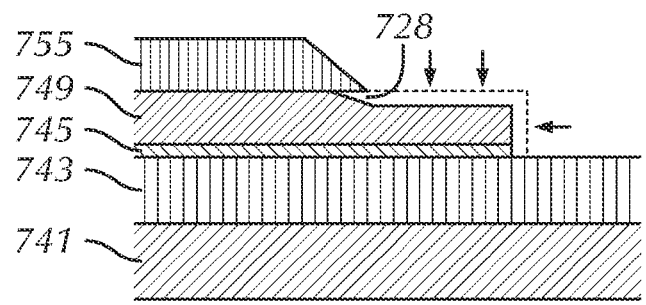
Figure 7C:
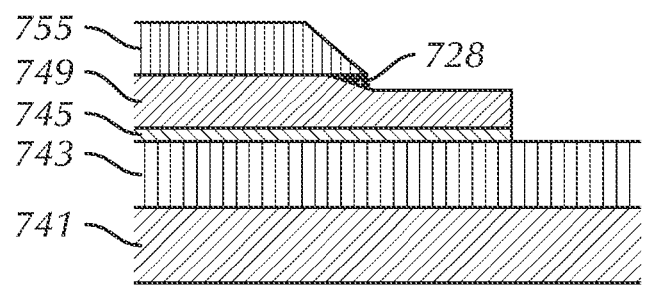
Figure 7D:
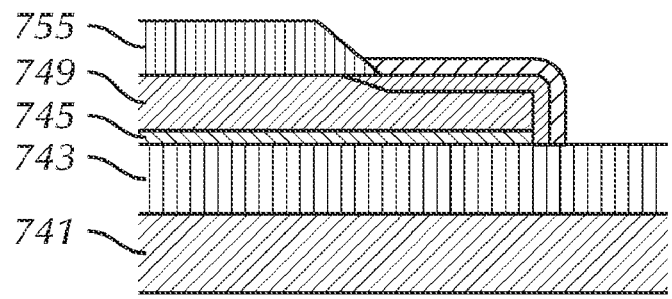
Figure 8A:
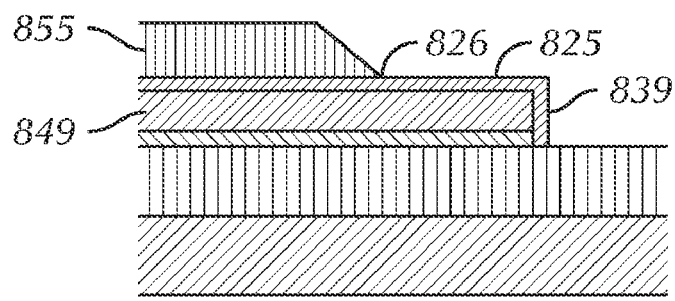
FIGS. 8A-8B are process drawings illustrating conductor etching and plating operations according to the prior art.
Figure 8B:
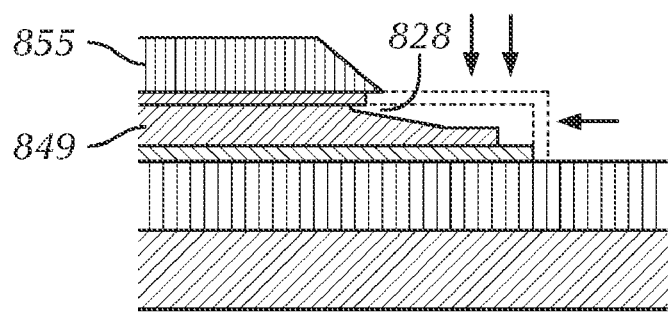

FIG. 6 is a diagram of three plating baths. Immersion of a workpiece 650 with conductor 649 in all three plating baths can follow a single surface-etching of the conductor.

First, workpiece 650 with conductor 649 can be immersed in a fill-plating bath 661, to fill-plate a fill metal in and around conductor 649. A fill metal is usually the same metal as the conductor. Fill-plating is generally to fill in gaps and holes in a conductor.

Second, whether or not the conductor is fill-plated in fill-plating bath 661, workpiece 650 with conductor 649 can be immersed in protective-metal-plating bath 663, to protective-metal-plate a protective metal over conductor 649. The result is a protective metal shell over conductor 649.

Third, workpiece 650 with conductor 649 and a protective metal shell can be moved from protective-metal-plating bath 663 to contact-metal-plating bath 665 such that the protective metal shell does not dry out. In contact-metal-plating bath 665, the protective metal shell can be plated over with a contact metal shell.

If workpiece 650 with conductor 649 with the protective metal shell is moved from protective-metal-plating bath 663 to contact-metal-plating bath 665 in such a way that the protective metal shell does not dry out, then there is less of a chance that the protective metal will oxidize. If the protective metal does not oxidize, then it is not critical to prepare or activate the surface of the protective metal with a surface etch before the next plating operation begins. The workpiece may be moved between plating baths in a high humidity environment, or in a low humidity environment if the workpiece is moved quickly. Preferably, workpiece 650 is moved from protective-metal-plating bath 663 to contact-metal-plating bath 665 within one minute, or more preferably within 30 seconds.

Similar to the movement from protective-metal-plating bath 663 to contact-metal-plating bath 665, the movement between fill-plating bath 661 and protective-metal-plating bath 663 can be accomplished sufficiently quickly so as to prevent the conductor or its fill metal from drying out.

A surface is deemed not to have dried out if a portion of the surface remains wet with the liquid from a plating bath. As one skilled in the art would realize, a workpiece does not need to be fully immersed in a plating bath to be plated.

FIGS. 9A-9J are process drawings showing an embodiment of a production method of an electrical interconnect in accordance with the present invention. FIGS. 9A-9D show initial processes in the production method, while FIGS. 9E-9J show subsequent processes in the production method.

Figure 9A:
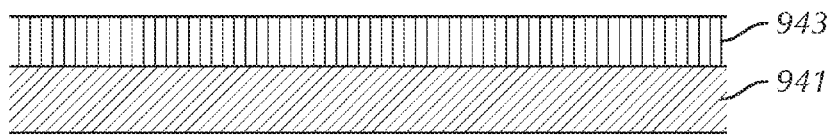
FIGS. 9A-9J are process drawings showing an embodiment of a production method of an electrical interconnect in accordance with the present invention, where.

FIG. 9A shows the providing of an insulating base 943 formed on the top of a supporting substrate 941.

Insulating base 943 can be a polyimide film. No particular limitation is imposed on the insulating material used to form insulating base 943, provided that the material is an insulator compatible for use in head suspension. Examples of such insulators include epoxies and synthetic resins including polyimide resin, polyamide-imide resin, acrylic resin, polyether nitrile resin, polyethylene naphthalate resin, and polyvinyl chloride resin. Of these resins, a photosensitive synthetic resin is preferable, and a photosensitive polyimide resin is more preferable. Insulating base 943 can be of any thickness compatible for use in a head suspension, including 15 micrometers (μm) thick.

No particular limitation is imposed on the material used for supporting substrate 941 provided that the material is compatible for use in a head suspension. Examples of such materials include stainless steel, aluminum, copper-beryllium, and phosphor bronze. Supporting substrate 941 can also be of varying thicknesses, including 30 μm thick.

Figure 9B:
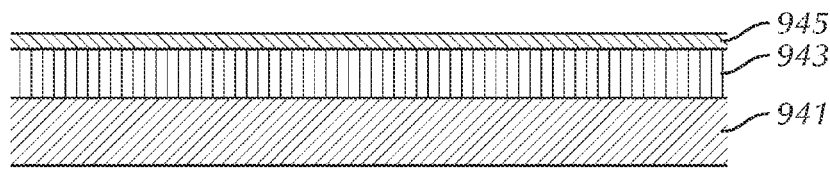

FIG. 9B shows the forming of a seed layer 945 on top of insulating base 943. Materials for seed layer 945 often include chromium (Cr), copper (Cu), or both. If both materials are used, then typically chromium is first sputtered on the insulating base, then copper is sputtering over the chromium. The thickness of the chromium is preferably in the range of 100-600 angstroms (Å), and the thickness of the copper is preferably in the range of 500-2000 Å.

Figure 9C:
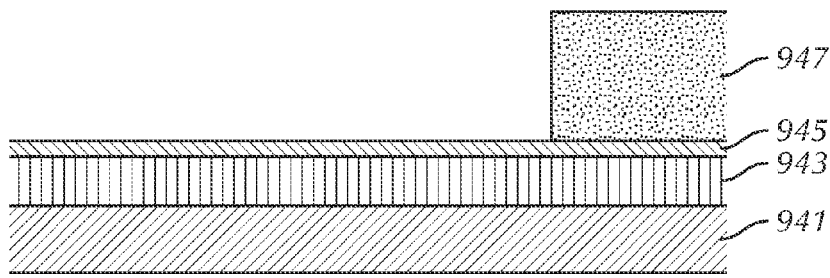
Figure 9D:
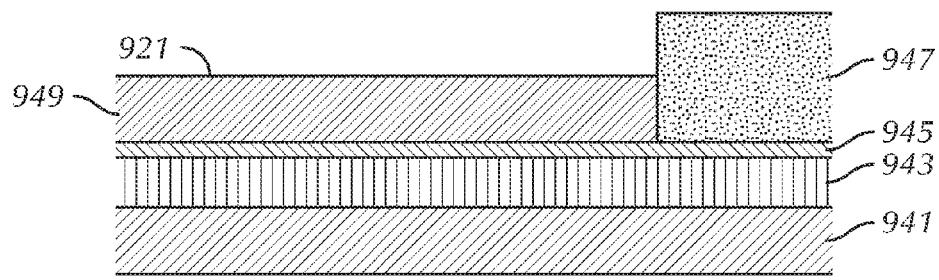

FIG. 9C shows the applying of plating resist pattern 947 on seed layer 945. FIG. 9D shows the conductor-plating of conductor 949 on seed layer 945 in a reversal pattern with respect to plating resist pattern 947. No particular limitation is imposed on the material used for the conductor provided that the material is conducting and compatible for use in a disk drive head suspension. For example, the material of the conductor can be copper, nickel, gold, or alloys of the foregoing, preferably an alloy containing copper. The plating can be performed in many ways, including electrolytic copper plating at room temperature. The thickness of the conductor usually is in the range of 3-35 μm, or preferably 5-18 μm.

FIG. 9D also illustrates what may be called an inchoate wired circuit board, with the pattern of conductor 949 defining a wire trace 921 in reversal pattern with respect to plating resist pattern 947 on top of seed layer 945, on top of insulating base 943.

Figure 9E:
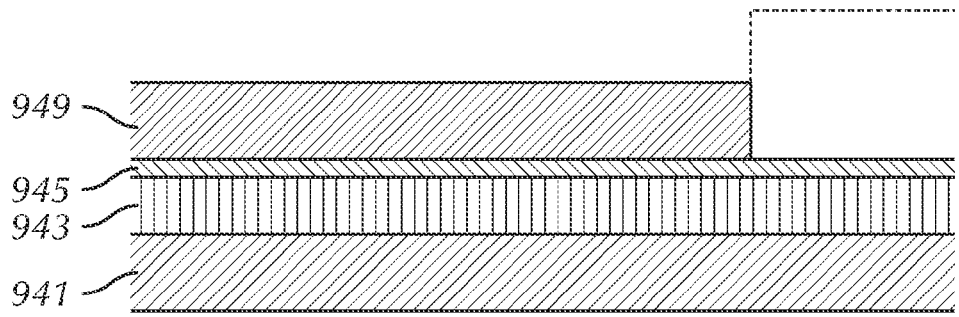
Figure 9F:
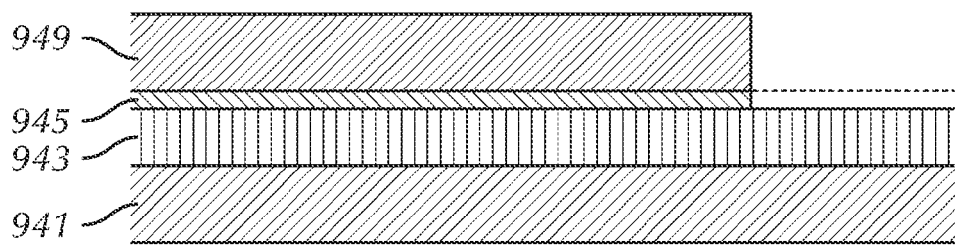
Figure 9G:
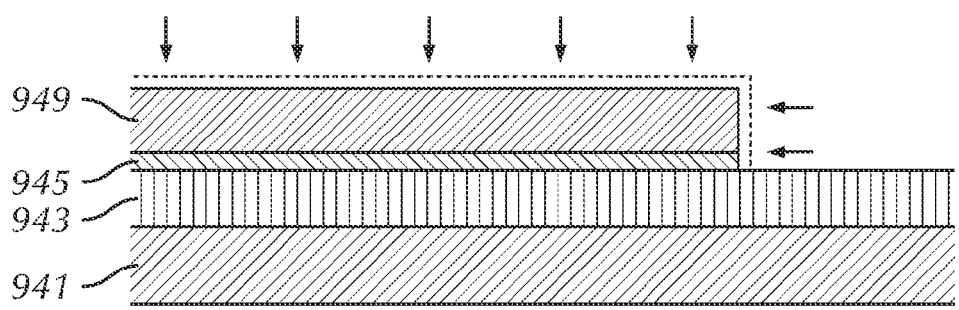
Figure 9H:
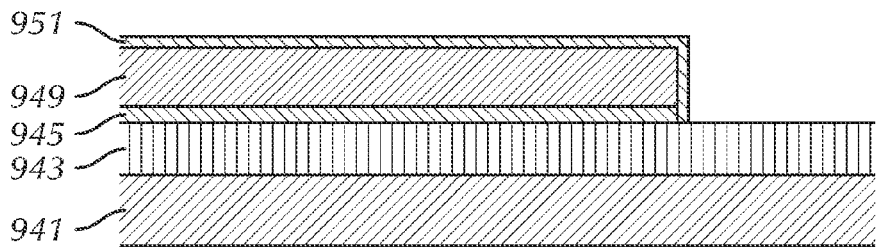

FIG. 9E shows the stripping of plating resist pattern 947 shown in FIG. 9D from areas adjacent conductor 949. FIG. 9F shows the etching of seed layer 945 from areas that had previously underlain plating resist pattern 947. FIG. 9G shows the surface-etching of the top and sides of conductor 949 as well as the side of seed layer 945. FIG. 9H shows protective-metal-plating a protective metal 951, such as nickel, on the top and sides of conductor 949 and on the side of seed layer 945. The thickness of protective metal 951 is preferably 1-5 μm, but may be 0.5-0.1 μm while still providing corrosion resistance.

Figure 9I:
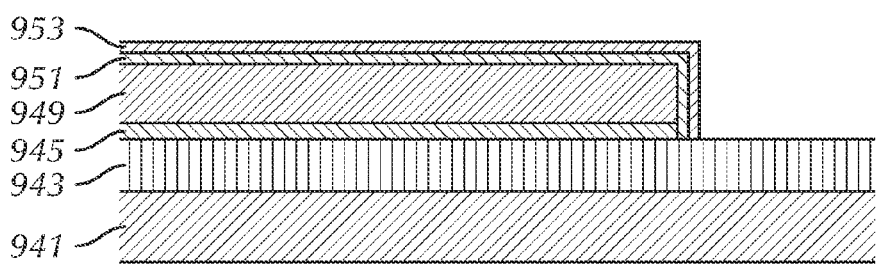

FIG. 9I shows contact-metal-plating a contact metal 953, such as gold, on the top and side of protective metal 951. The thickness of contact metal 953 is preferably 1-5 μm.

Figure 9J:
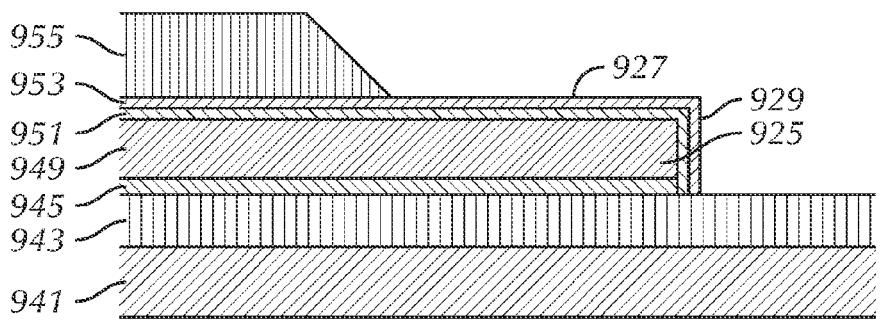

FIG. 9J shows the application of a covercoat 955 over contact metal 953. The non-covercoated, or exposed portion of at least one terminal pad 925 has an exposed top 927 and an exposed side 929. No particular limitation is imposed on material used for covercoat 955 provided that the material is compatible for use in a disk drive head suspension. For example, the material can be a synthetic resin such as polyimide, polyether nitrile, polyether sulfone, polyethylene terephthalate, polyethylene naphthalate, and polyvinyl chloride. The thickness of the covercoat layer is preferably 1-30 μm, and more preferably 2-5 μm.

Figure 10A:
FIGS. 10A-10R are process drawings showing an embodiment of a production method of an electrical interconnect with a grounding feature and a flying lead in accordance with the present invention, where.
Figure 10B:
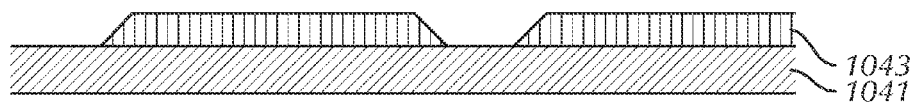
FIG. 10B shows the applying of an insulating base.
Figure 10C:
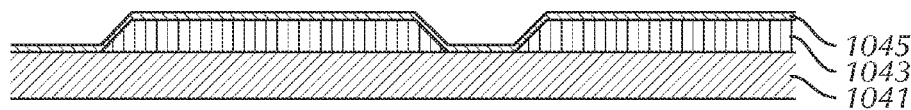
FIG. 10C shows the forming of a seed layer.
Figure 10D:
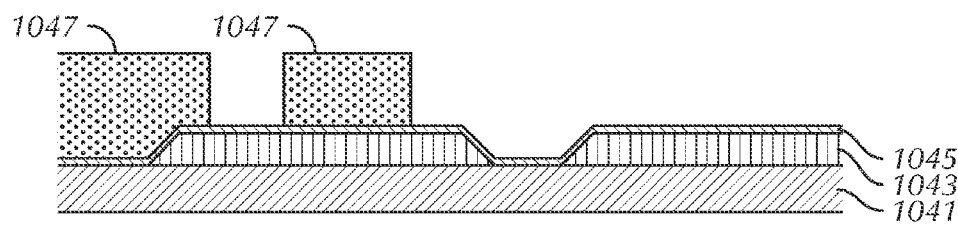
FIG. 10D shows the applying of a plating resist.
Figure 10E:
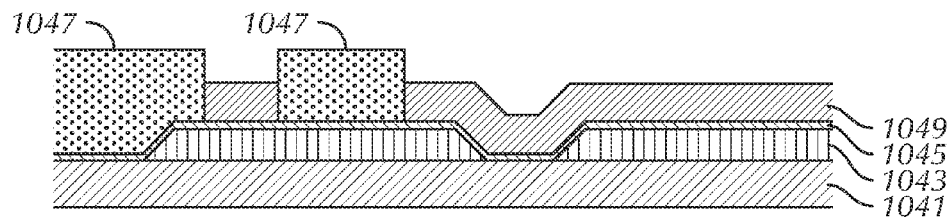
FIG. 10E shows the conductor-plating of a conductor.
Figure 10F:
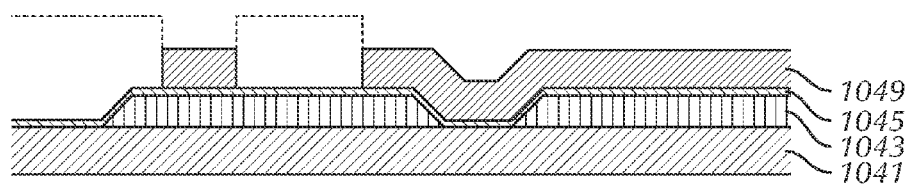
FIG. 10F shows the stripping of the plating resist.
Figure 10G:
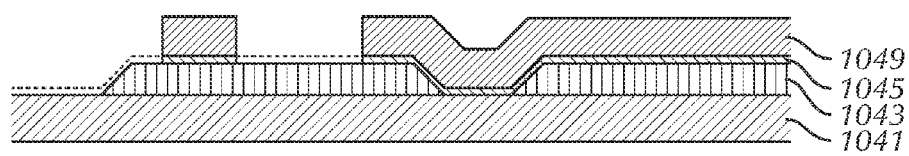
FIG. 10G shows the etching of the seed layer.
Figure 10H:
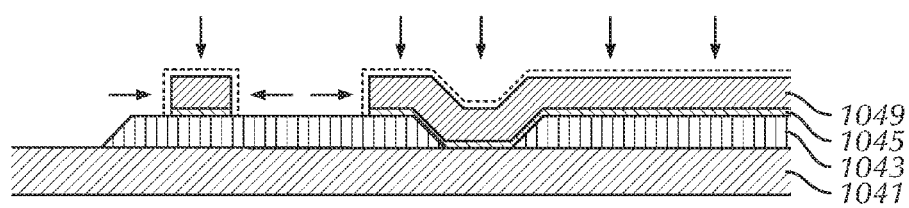
FIG. 10H shows the surface-etching of the conductor.
Figure 10I:
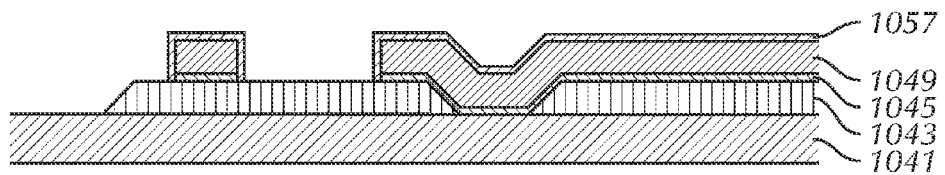
FIG. 10I shows fill-plating the conductor.
Figure 10J:
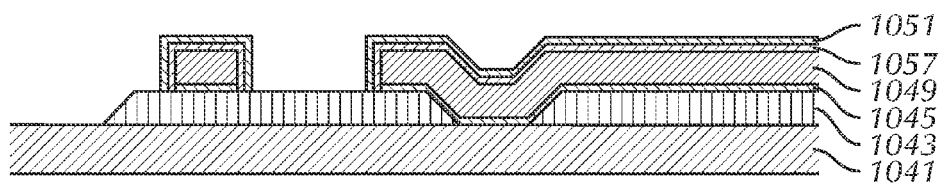
FIG. 10J shows protective-metal-plating.
Figure 10K:
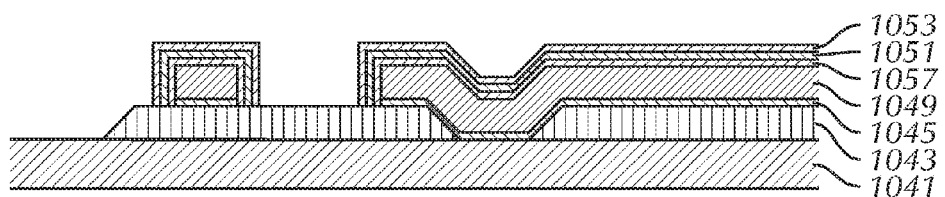
FIG. 10K shows contact-metal-plating.
Figure 10L:
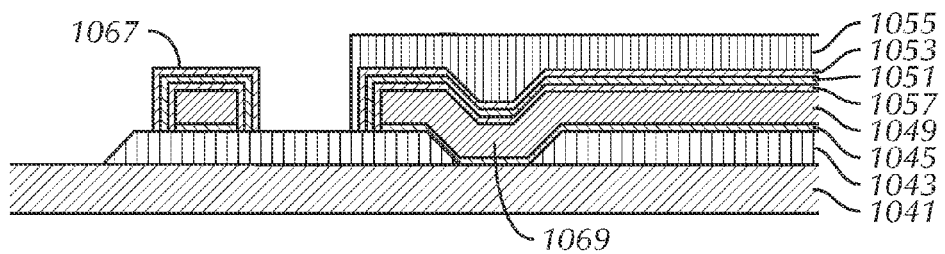
FIG. 10L shows the applying of a covercoat.
Figure 10M:
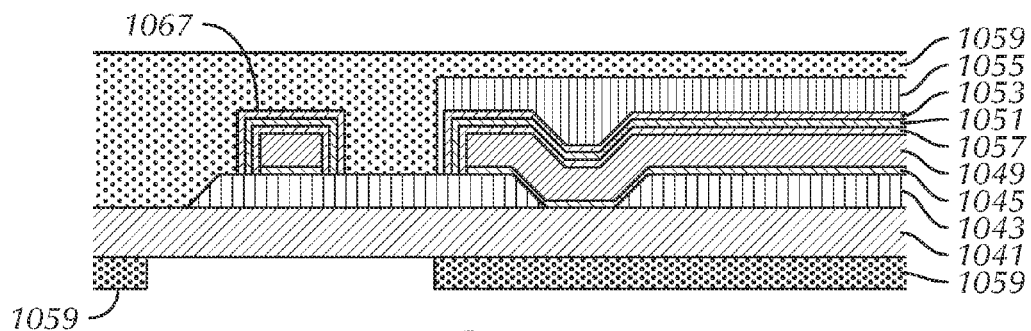
FIG. 10M shows the applying of an etch resist.
Figure 10N:
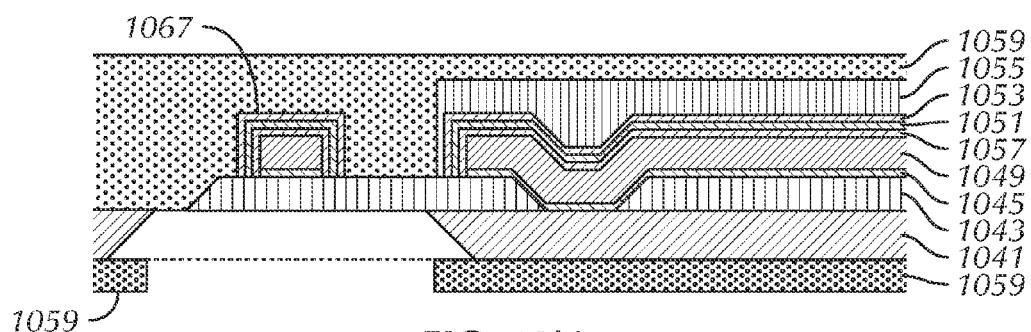
FIG. 10N shows the etching of the supporting substrate.
Figure 10O:
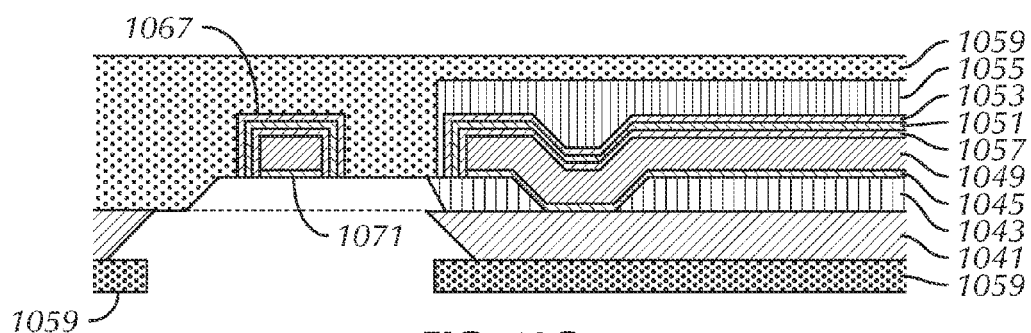
FIG. 10O shows the removing of the insulating base.
Figure 10P:
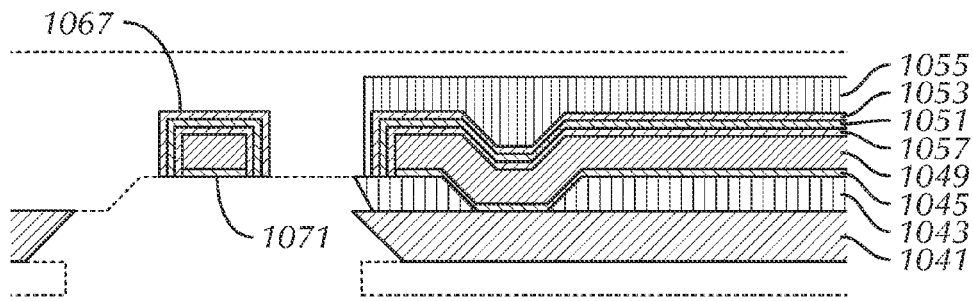
FIG. 10P shows the stripping of the etch resist.
Figure 10Q:
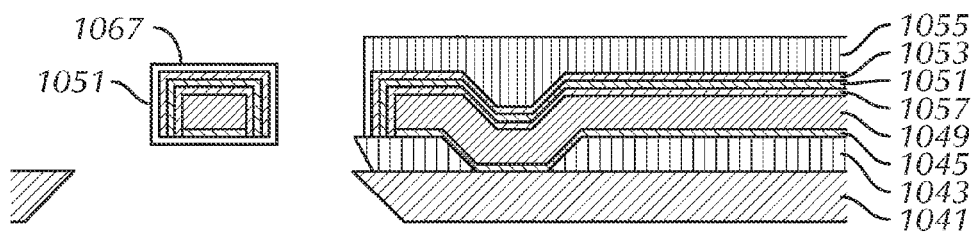
FIG. 10Q shows protective-metal-plating a second time.
Figure 10R:
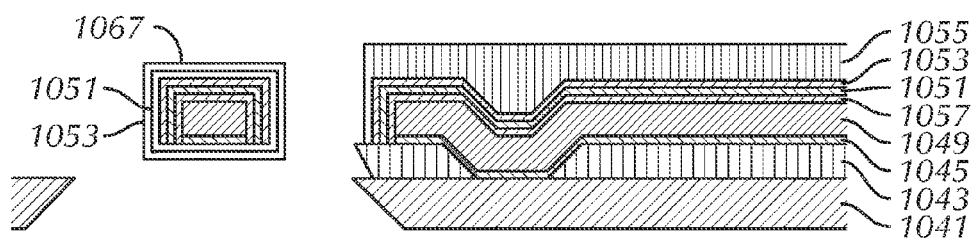

FIGS. 10A-10R are process drawings showing an embodiment of a production method of an electrical interconnect in accordance with the present invention used to produce an electrical interconnect with a flying lead, shown on the left of the progressing figures, and a grounding feature, shown on the right of the progressing figures.

FIG. 10A shows the providing of a supporting substrate 1041. FIG. 10B shows the application of an insulating base 1043 onto portions of supporting substrate 1041. FIG. 10C shows the deposition of a seed layer 1045 on both insulating base 1043 and exposed areas of supporting substrate 1041. FIG. 10D shows the application of a plating resist pattern 1047 over portions of seed layer 1045.

FIG. 10E shows the conductor-plating of a conductor 1049 on top of exposed portions of seed layer 1045, opposite supporting substrate 1041. FIG. 10F shows the stripping of plating resist pattern 1047 shown in FIG. 10E. FIG. 10G shows the etching of exposed portions of seed layer 1045 from insulating base 1043 and supporting substrate 1041. FIG. 10H shows the surface-etching of conductor 1049 and sides of seed layer 1045 in preparation for plating.

FIG. 10I shows the fill-plating of a fill metal 1057 on conductor 1049. FIG. 10J shows protective-metal-plating a protective metal 1051 over conductor 1049 and fill metal 1057. FIG. 10K shows contact-metal-plating a contact metal 1053 over protective metal 1051. FIG. 10L shows the application of a covercoat 1055 over portions of contact metal 1053.

The rectangular feature on the left of the figure is an inchoate flying lead 1067 which is left exposed. The rest of the figures will show the further processing of inchoate flying lead 1067. The "V"-shaped feature on the right of the figure is a grounding feature 1069. Grounding feature 1069 is grounded to supporting conductive substrate 1041.

FIG. 10M shows the application of etch resist patterns 1059 to both the top and bottom of the workpiece, with the bottom having an exposed portion of supporting substrate 1041 underneath inchoate flying lead 1067. FIG. 10N shows the bottom-etching of a portion of supporting substrate 1041 from underneath inchoate flying lead 1067. FIG. 10O shows the bottom-etching of a portion of insulating base 1043 from underneath flying lead 1067. Flying lead 1067 now has an exposed bottom surface 1071. FIG. 10P shows the stripping of etch resist pattern 1059 shown in FIG. 10O so that flying lead 1067 is entirely exposed.

FIG. 10Q shows a second protective-metal-plating, performed to protective-metal-plate the bottom of a flying lead 1067 with protective metal 1051. FIG. 10R shows a second contact-metal-plating, performed to contact-metal-plate the bottom of flying lead 1067 with contact metal 1053. The result is an electrical interconnect with a flying lead and a grounding feature.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

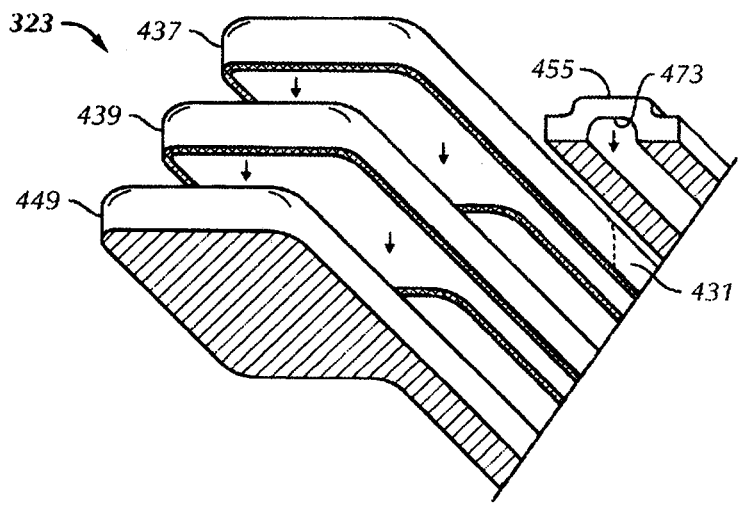

What is claimed is:

1. An electrical interconnect for a disk drive head suspension comprising:
   an insulating base;
   a conductor arrayed in a wiring pattern on said insulating base;
   a substrate supporting said insulating base opposite said conductor;
   a nickel shell, said nickel shell coating substantially all an upper surface and side surfaces of said conductor;
   a gold shell, said gold shell coating substantially all of said nickel shell, wherein said conductor, nickel shell and gold shell define at least one terminal pad; and
   a covercoat, said covercoat coating substantially all of said gold shell up to but excluding said at least one terminal pad, whereby said terminal pad has an exposed gold top and an exposed gold side.

2. The electrical interconnect of claim 1 wherein an exposed portion of said gold shell on said terminal pad has a same general thickness as a covered portion of said gold shell underneath said covercoat, said covered portion disposed adjacent said exposed portion.

3. The electrical interconnect of claim 1 wherein said nickel shell was formed in a single plating bath.

4. The electrical interconnect of claim 3 wherein said gold shell was formed in a single plating bath.

5. The electrical interconnect of claim 1 wherein said nickel shell and said gold shell also coat underneath said conductor on a flying lead thereof.

6. The electrical interconnect of claim 1 wherein said substrate is part of a load beam.

7. The electrical interconnect of claim 1 wherein:
said substrate comprises stainless steel;
said insulating base comprises a polyimide film;
said conductor is selected from the group consisting of copper, silver, and gold; and
said nickel shell is an electroless nickel plated shell.

8. An electrical interconnect for a disk drive head suspension comprising:
an insulating base;
a circuit pattern formed on said base, said circuit pattern having an exposed surface and a covered surface; and
a covercoat having a bottom surface, said covercoat covering substantially all said circuit pattern covered surface;
said circuit pattern comprising:
a conductor having a top and sides;
a protective metal coating having a top and sides, said protective metal coating covering substantially all said top and sides of said conductor; and
a contact metal coating, said contact metal coating covering substantially all said top and sides of said protective metal coating, said contact metal coating having a top surface;
wherein said contact metal coating top surface on said exposed surface extends flush underneath said covercoat to said covered surface.

9. The electrical interconnect of claim 8 wherein said protective metal coating and said contact metal coating are electrically conductive.

10. The electrical interconnect of claim 9 wherein:
said insulating base comprises a polyimide film;
said conductor is selected from the group consisting of copper, silver, and gold;
said protective metal coating is nickel;
said contact metal coating is gold; and
said covercoat is polyimide.

11. The electrical interconnect of claim 8, further comprising a substrate supporting said insulating base opposite said conductor.

12. The electrical interconnect of claim 11 wherein said substrate is part of a load beam.

13. A disk drive head suspension comprising the electrical interconnect of claim 8, and further comprising a load beam supporting said electrical interconnect and a flexure supported by said load beam.

14. A hard disk drive comprising the head suspension of claim 13, and further comprising a slider and a data storage disk, said head suspension supporting said slider in close proximity to said disk.

15. An electrical interconnect for a disk drive head suspension having a terminal pad region, said region comprising:
a wire trace having a terminal pad, said wire trace comprising:
a conductor;
a protective metal shell covering said conductor; and
a contact metal shell covering said protective metal shell;
a covercoated area adjacent to said terminal pad;
wherein said contact metal shell extends substantially underneath said covercoated area.

16. The electrical interconnect of claim 15 wherein an exposed portion of said contact metal shell on said terminal pad has a same general thickness as a covered portion of said contact metal shell in said covercoated area.

17. The electrical interconnect of claim 15 wherein said protective metal shell was formed in a single plating bath.

18. A disk drive head suspension comprising the electrical interconnect of claim 15, and further comprising a load beam supporting said electrical interconnect and a flexure supported by said load beam.

19. A hard disk drive comprising the head suspension of claim 18, and further comprising a slider and a data storage disk, said head suspension supporting said slider in close proximity to said disk.

20. The electrical interconnect of claim 15 wherein said covercoated area is defined by a polyimide covercoat over said area.

* * * * *

UNITED STATES PATENT AND TRADEMARK OFFICE
CERTIFICATE OF CORRECTION

| | | |
|---|---|---|
| PATENT NO. | : 8,320,083 B1 | |
| APPLICATION NO. | : 11/951619 | |
| DATED | : November 27, 2012 | |
| INVENTOR(S) | : Chrisptopher Dunn et al. | |

It is certified that error appears in the above-identified patent and that said Letters Patent is hereby corrected as shown below:

Delete title page and substitute the attached title page therefor.

In column 12, line 39, insert -- 21. The electrical interconnect of claim 1 wherein the covercoat is polyimide. --

Signed and Sealed this
Fifth Day of February, 2013

Teresa Stanek Rea
*Acting Director of the United States Patent and Trademark Office*

CERTIFICATE OF CORRECTION (continued)

(12) United States Patent
Dunn et al.

(10) Patent No.: US 8,320,083 B1
(45) Date of Patent: Nov. 27, 2012

(54) ELECTRICAL INTERCONNECT WITH IMPROVED CORROSION RESISTANCE FOR A DISK DRIVE HEAD SUSPENSION

(75) Inventors: Christopher Dunn, Austin, TX (US); Keith A. Vanderlee, Austin, TX (US)

(73) Assignee: Magnecomp Corporation, Murrieta, CA (US)

(*) Notice: Subject to any disclaimer, the term of this patent is extended or adjusted under 35 U.S.C. 154(b) by 1262 days.

(21) Appl. No.: 11/951,619

(22) Filed: Dec. 6, 2007

(51) Int. Cl.
G11B 21/16 (2006.01)
G11B 5/48 (2006.01)

(52) U.S. Cl. ............ 360/245.9; 360/234.5; 360/245.8; 360/264.2

(58) Field of Classification Search ............ 360/245.8, 360/245.9, 246, 234.5, 264.2
See application file for complete search history.

(56) References Cited

U.S. PATENT DOCUMENTS

| | | | |
|---|---|---|---|
| 5,666,717 A | 9/1997 | Matsumoto et al. | |
| 6,075,676 A * | 6/2000 | Hiraoka et al. | 360/264.2 |
| 6,106,688 A | 8/2000 | Miyazaki et al. | |
| 6,360,427 B1 * | 3/2002 | Takasugi | 29/603.06 |
| 6,399,899 B1 | 6/2002 | Ohkawa et al. | |
| 6,515,832 B1 * | 2/2003 | Girard | 360/245.3 |
| 6,996,901 B2 | 2/2006 | Honjo et al. | |
| 7,067,912 B2 | 6/2006 | Takeuchi et al. | |
| 7,129,418 B2 | 10/2006 | Aonuma et al. | |
| 7,142,395 B2 | 11/2006 | Swanson et al. | |
| 7,372,669 B2 * | 5/2008 | Deguchi et al. | 360/245.9 |
| 2005/0023703 A1 * | 2/2005 | Sebesta et al. | 257/780 |
| 2005/0186332 A1 | 8/2005 | Funada et al. | |
| 2007/0051534 A1 | 3/2007 | Ishii et al. | |
| 2008/0192384 A1 * | 8/2008 | Danielson et al. | 360/245.9 |
| 2008/0247074 A1 * | 10/2008 | Nave et al. | 360/69 |

FOREIGN PATENT DOCUMENTS

| | | | |
|---|---|---|---|
| JP | 60-119765 A * | 6/1985 | |
| JP | 2008-60133 A * | 3/2008 | |

* cited by examiner

*Primary Examiner* — Jefferson Evans
(74) *Attorney, Agent, or Firm* — Intellectual Property Law Offices of Joel Voelzke, APC

(57) ABSTRACT

An electrical interconnect and a method of making an electrical interconnect in which a conductor has been substantially plated with a first protective metal shell, such as nickel, and a second outer metal shell, such as gold, before a covercoat has been applied. Such an electrical interconnect can be characterized as having an even-thickness outer shell on both its terminal pads and underneath the covercoat adjacent to the terminal pads, without overhangs or gaps near the bottom of the covercoat caused by surface etching during production.

21 Claims, 14 Drawing Sheets